US008681775B2

(12) United States Patent
Multach et al.

(10) Patent No.: US 8,681,775 B2
(45) Date of Patent: Mar. 25, 2014

(54) SWITCHABLE VOICE SOURCE NETWORK INTERFACE DEVICE MODULE

(75) Inventors: Jeffrey Multach, San Antonio, TX (US); William R. Hurst, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 787 days.

(21) Appl. No.: 11/396,933

(22) Filed: Apr. 3, 2006

(65) Prior Publication Data
US 2007/0230442 A1    Oct. 4, 2007

(51) Int. Cl.
H04L 12/66    (2006.01)
H04L 12/413   (2006.01)
H04J 3/02     (2006.01)

(52) U.S. Cl.
USPC ............ 370/352; 370/347; 370/462; 370/463

(58) Field of Classification Search
USPC .................................. 370/352, 462, 463, 447
See application file for complete search history.

(56) References Cited

U.S. PATENT DOCUMENTS

| | | | |
|---|---|---|---|
| 6,028,919 A | 2/2000 | Bingel et al. | |
| 6,282,192 B1 * | 8/2001 | Murphy et al. | 370/352 |
| 6,301,340 B1 * | 10/2001 | Sansom et al. | 379/93.06 |
| 6,343,114 B1 | 1/2002 | Chea, Jr. | |
| 6,470,059 B2 | 10/2002 | Starr | |
| 6,658,098 B2 * | 12/2003 | Lamb et al. | 379/93.36 |
| 6,754,317 B1 * | 6/2004 | Berthoud et al. | 379/93.24 |
| 6,785,325 B1 | 8/2004 | Liu et al. | |
| 6,898,276 B1 | 5/2005 | Millet et al. | |
| 6,898,413 B2 | 5/2005 | Yip et al. | |
| 7,254,110 B2 * | 8/2007 | Wissing et al. | 370/218 |
| 7,408,923 B1 * | 8/2008 | Khan et al. | 370/352 |
| 2002/0041642 A1 * | 4/2002 | Bonhomme | 375/343 |
| 2002/0196774 A1 * | 12/2002 | Wissing et al. | 370/352 |
| 2003/0005069 A1 | 1/2003 | DePaul et al. | |
| 2003/0007614 A1 * | 1/2003 | Lamb et al. | 379/93.36 |
| 2003/0133437 A1 * | 7/2003 | Richarson et al. | 370/352 |
| 2003/0133438 A1 * | 7/2003 | Richarson et al. | 370/352 |
| 2004/0022237 A1 * | 2/2004 | Elliott et al. | 370/356 |
| 2004/0151163 A1 * | 8/2004 | Jang | 370/352 |
| 2005/0276272 A1 * | 12/2005 | Arai | 370/401 |
| 2006/0013195 A1 * | 1/2006 | Son et al. | 370/352 |
| 2006/0029050 A1 * | 2/2006 | Harris et al. | 370/356 |
| 2006/0062255 A1 * | 3/2006 | Holloway et al. | 370/477 |
| 2006/0159116 A1 * | 7/2006 | Gerszberg et al. | 370/431 |
| 2007/0147345 A1 * | 6/2007 | Lowmaster | 370/352 |

* cited by examiner

*Primary Examiner* — Hassan Phillips
*Assistant Examiner* — Lonnie Sweet
(74) *Attorney, Agent, or Firm* — Hanley, Flight & Zimmerman, LLC.

(57) ABSTRACT

A system and method for switching between voice signals. The system includes a network interface device and a digital logic device. The network interface device may include a splitter and a switch. The splitter includes a network input configured to receive a combined voice and digital signal. The splitter generates a separate first voice output and a digital signal. The first voice signal is provided from the splitter to the switch, while the digital signal is provided to the digital logic device. The digital logic device is configured to generate a second voice signal that is also provided to the switch. Further, the digital logic device provides a control signal to the switch. The control signal manipulates the switch to selectively provide either the first or second voice signal to a voice output.

12 Claims, 3 Drawing Sheets

SWITCHABLE VOICE SOURCE NETWORK INTERFACE DEVICE MODULE

TECHNICAL FIELD

The present disclosure generally relates to a telephonic switching device and method.

BACKGROUND

Voice and digital signals have been provided over telephone lines for many years. Accordingly, interface devices have been provided to split the combined signal into separate digital and voice signals. The digital signals are provided to appropriate digital devices while the analog voice signals are provided to phones or other voice appropriate devices. More recently, systems have been provided to multiplex such digital and analog signals to appropriate devices within a customer network. Now voice services are being provided over digital data signals carried over the telephone lines. For example, voice over internet protocol (VoIP) service can be provided through a digital connection such as a digital subscriber line (DSL) connection. As such, customers now have a choice of receiving voice signals from multiple sources. Accordingly, there is a need for a system and method for handling multiple voice signals.

DETAILED DESCRIPTION

Figure 1:
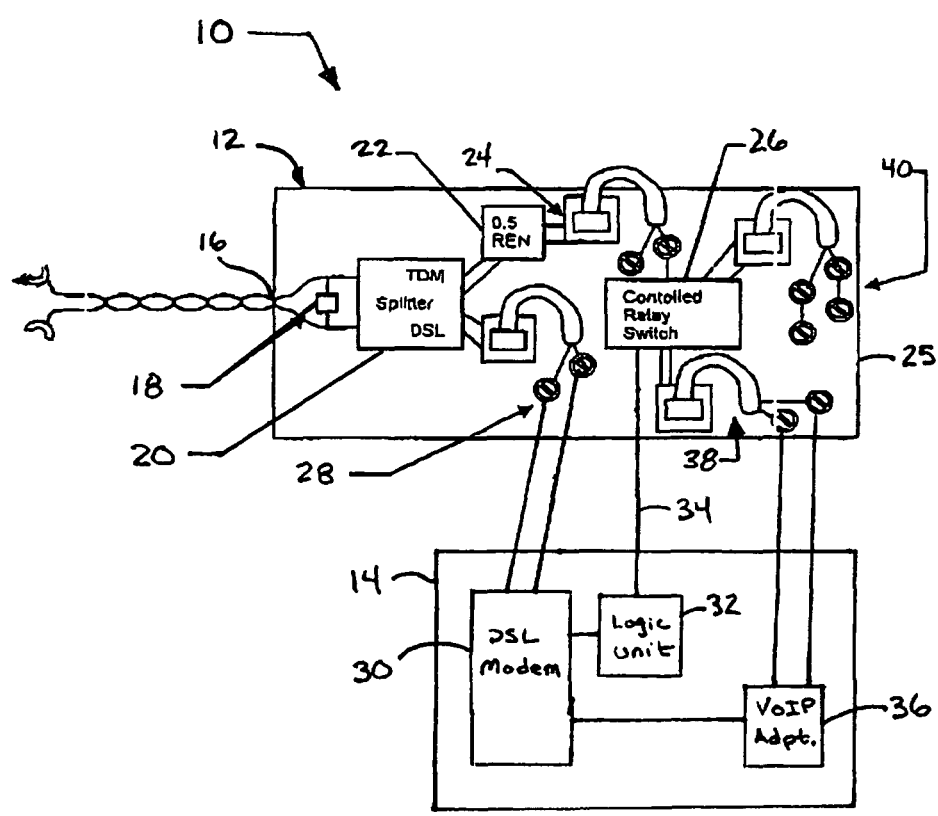
FIG. 1 is a schematic view of a switching system.

To accommodate multiple voice signals, hardware may be provided at the customer site to receive a combined digital data and analog voice signal and selectively provide a connection to the customer network for either a standard voice signal or a VoIP signal. Further, logic may be provided with the device to selectively provide either the standard voice signal or the VoIP signal based on configuration information embedded in the digital signal. For example, the device may provide the VoIP signal to a customer wiring network, if it is determined that the VoIP signal is active. While alternatively, the device would provide an analog voice signal to the home wiring network, if the VoIP signal was not activated. By providing such functionality, service may be continuously provided to the end user without significant switchover costs or complexity. The system may also be provided in modules to reduce cost and extend the life of the modules within the consumer environment. For example, a splitter and relay may be provided in a single package such that the digital signal or voice signal can be split into separate signals. The voice signal may be provided directly to the relay while the digital signal may be provided to a separate package that is configured to interpret the digital signal, convert the digital signal to a second voice signal, provide the second voice signal back to the relay, and provide a control signal to control the relay. Accordingly, the logic and hardware that are used to interpret the digital signal and control the relay switch may be easily replaced and updated as digital protocols change. Meanwhile, the base splitter and relay hardware may be left intact.

In one embodiment, the system may include a network interface device and a digital logic device. The network interface device includes a splitter and a switch, such as a relay. The splitter includes a network input configured to receive a combined voice and digital signal. The splitter generates a separate first voice output and a digital signal. The first voice signal is provided from the splitter to the switch, while the digital signal is provided to the digital logic device. The digital logic device is configured to generate a second voice signal that is also provided to the switch. Further, the digital logic device interprets the digital signal and provides a control signal to the switch. The control signal manipulates the switch to selectively provide either the first or second voice signal to a voice output. The digital logic device is configured to control the switch based on configuration information from the digital signal, such as a VoIP activation signal, although other configuration information may be used. In one embodiment, the digital signal may be a DSL signal while the first and second voice signals may be time division multiplexing (TDM) signals. Accordingly, the digital logic device may include a DSL modem that is in communication with a VoIP adapter to generate the second voice signal from the digital signal. In addition, the DSL modem may be in communication with a logic unit configured to interpret the digital signal and generate a control signal that is provided to the switch based on the configuration information in the digital signal.

In another embodiment, a method is provided for switching between the first voice signal and the VoIP signal. The method includes receiving the combined analog voice and digital signal and separating the combined analog voice and digital signal into a first analog voice signal and a digital signal. Further, the method includes converting the digital signal into a second voice signal, and providing the first and second voice signal to the switch. In addition, the method also includes selectively providing the first and second voice signal to a voice output based on information from the digital signal.

Referring to FIG. 1, an illustrative embodiment of a switching system 10 is provided. The system 10 includes a network interface device 12 and a digital logic device 14. The network interface device 12 has a network interface input 16 configured to receive a combined voice and digital signal from a telecommunication network, such as a public switched telephone network (PSTN) over a twisted copper pair. A surge protection device 18 is provided between the pair connections. The combined voice and digital signal is provided to the splitter 20. The splitter 20 separates the combined signal into a separate first voice signal and a digital signal. In the embodiment described, the voice signal may be an analog voice signal, such as a TDM signal or other common analog voice signal. The digital signal may be DSL, Ethernet or other common digital protocol based signal and may contain additional digital signals such as internet protocol (IP). The first voice signal is provided through a load such as a 0.5 REN (ring equivalent number) load to a connection point 24 that may include terminals and a test jack. The test jack may be a RJ-11 test jack and may include tie down posts or terminals. The first voice signal is provided through the connection point 24 to a controlled switch 26. The switch 26 may be a relay or other common switching device including mechanical or solid state devices. The digital signal is provided from the splitter 20 to connection point 28 which may also include a test jack and tie down posts or terminals. The connection point 28 provides an external connection to a digital logic device 14. The network interface device 12 has a housing 25 that encloses the splitter 20 and switch 26 thereby providing a self-contained module.

The digital logic device 14 may include a DSL modem 30, a logic unit 32, and a VoIP adapter 36. The digital signal is provided through connection point 28 to the DSL modem 30. The DSL modem 30 provides the digital signal to the logic unit 32 and the VoIP adapter 36. The VoIP adapter 36 converts the digital signal into a second voice signal. Similar to the first voice signal, the second voice signal may be an analog voice signal, such as a TDM signal or other common analog voice signal. The second voice signal is provided through an external connection into the network interface device 12 at connection point 38. Connection point 38 may be a terminal post, tie downs, or a jack, such as an RJ-11 jack. Connection point 38 provides the second voice signal from the VoIP adapter to the switch 26. The logic unit 32 interprets the digital signal and provides a control signal 34 to the switch 26 based on information from the digital signal, including configuration information such as a VoIP service active signal, a VoIP connectivity signal, a DSL connectivity signal, or an IP connectivity signal. Accordingly, the logic unit 32 through the switch 26 may selectively provide the first or second voice signal to an output connection point 40 that may be connected to a home wiring network. Accordingly, a logic unit 32 may separately facilitate connection of a traditional analog voice signal or a VoIP voice signal to the customer wiring network based on VoIP configuration information contained within the digital signal. In addition, although the embodiment discussed references a single first voice signal, multiple first voice signals may be accommodated. Similarly, by duplicating the embodiment shown, multiple digital signals may be used to generate multiple second voice signals.

Figure 2:
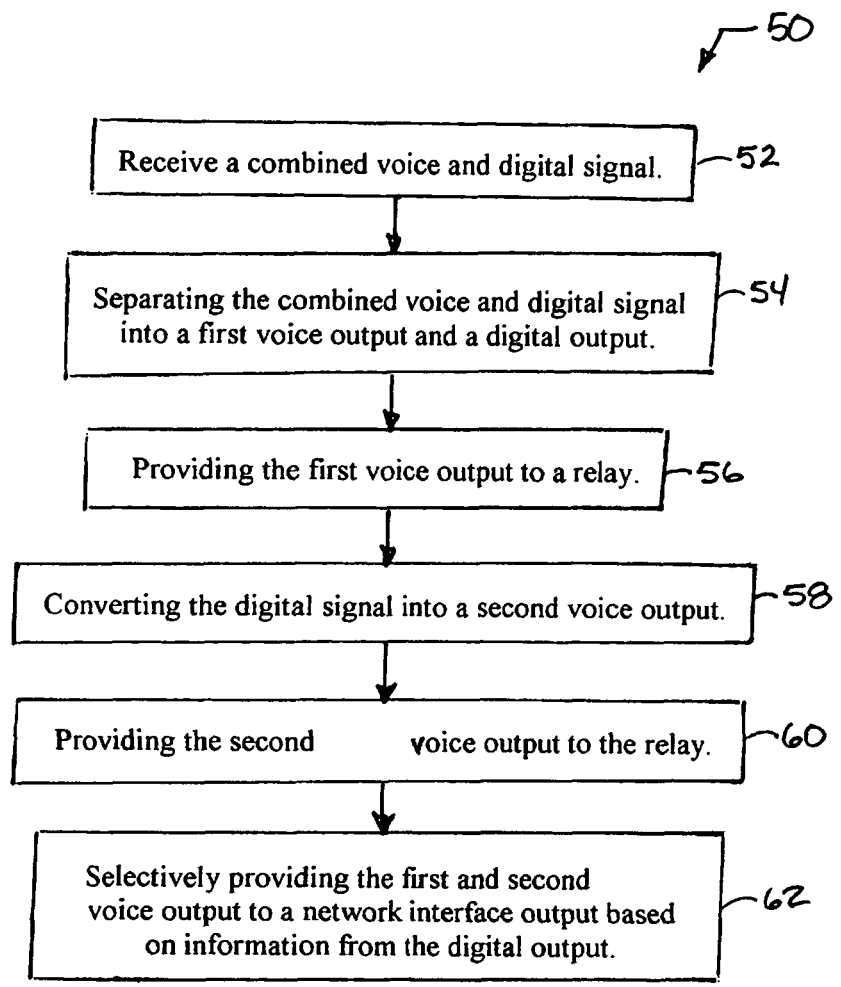
FIG. 2 is a flow chart illustrating a method for controlling a switching system.

Now referring to FIG. 2, a method 50 is provided for switching between the voice signal and a digital signal. The method begins in block 52 where a combined voice and digital signal is received by the system 10. The combined voice and data signal may be received over a copper twisted pair into a network interface device 12 that is configured as a splitter switch module. In block 54, the combined voice and digital signal is separated into a first voice signal and a digital signal. The first voice signal may be an analog voice signal such as a TDM signal, while the digital output may be a DSL or similar signal. The first voice output is provided to a switch 26, as denoted by block 56. In block 58, the digital signal is converted into a second voice output, such as a TDM signal. In one embodiment, the digital signal may be converted using a DSL modem 30 feeding into a VoIP adapter 36. Further, the VoIP adapter 36 can provide the second voice output to the switch 26, as denoted by block 60. In block 62, the switch is in communication with a logic unit 32 that is configured to interpret the digital signal and provide a control signal 34 to manipulate the output of the switch 26. As such, the switch 26 is configured to selectively provide the first voice signal and the second voice signal to a voice output, such as connection point 40, configured to be connected to the customer site wiring. The logic unit 32 manipulates the switch 26 based on configuration information from the digital signal. For example, the configuration information may include a VoIP active signal, a VoIP ready signal, an IP connection available signal, or similar configuration signal. As such, the configuration information may be provided at various protocol levels within the digital signal.

The digital logic device 14 or any sub-component of the digital logic device 14, such as the logic unit 32, may comprise a general computer system as shown in FIG. 4 and designated at reference numeral 90. The computer system 90 can include a set of instructions that can be executed to cause the computer system 90 to perform any one or more of the methods or computer based functions disclosed herein. The computer system 90 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 90 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 90 can be implemented using electronic devices that provide voice, video or data communication. Further, while a single computer system 90 is illustrated, the term "system" shall also be taken to include any collection of systems or sub-systems that individually or jointly execute a set, or multiple sets, of instructions to perform one or more computer functions.

Figure 3:
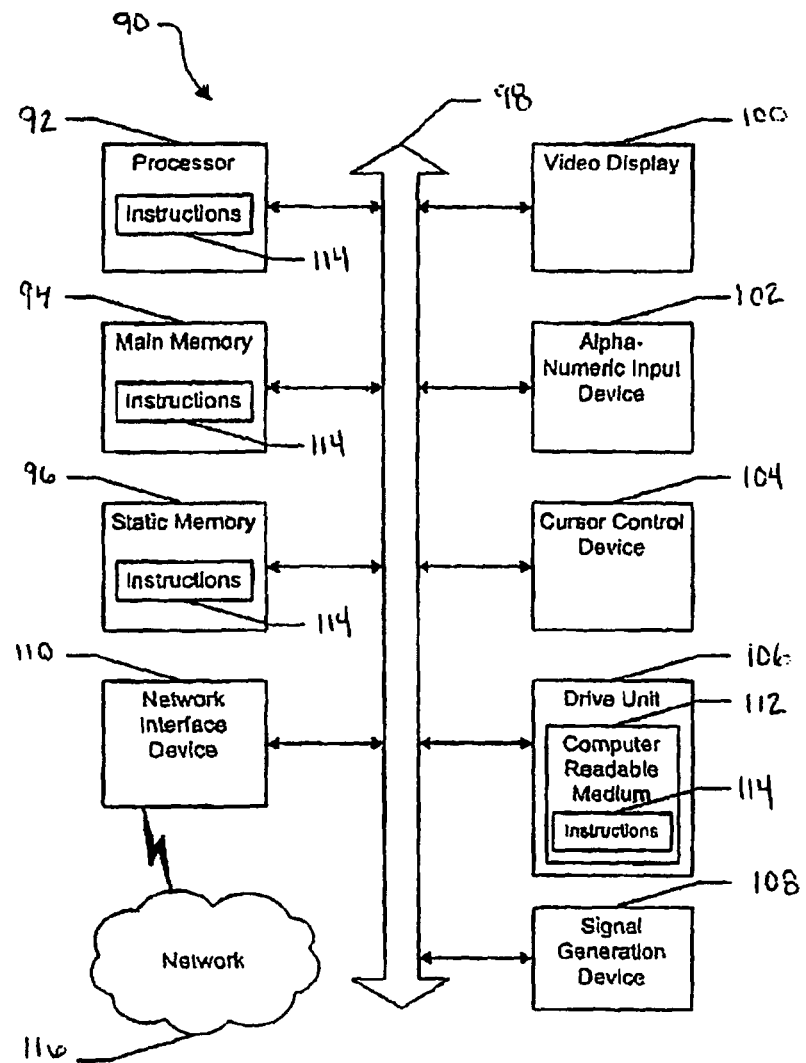
FIG. 3 is a block diagram of a general computing system.

As illustrated in FIG. 3, the computer system 90 may include a processor 92, e.g., a central processing unit (CPU), a graphics processing unit (GPU), or both. Moreover, the computer system 90 can include a main memory 94 and a static memory 96 that can communicate with each other via a bus 98. As shown, the computer system 90 may further include a video display unit 100, such as a liquid crystal display (LCD), an organic light emitting diode (OLED), a flat panel display, a solid state display, or a cathode ray tube (CRT). Additionally, the computer system 90 may include an input device 102, such as a keyboard, and a cursor control device 104, such as a mouse. The computer system 90 can also include a disk drive unit 106, a signal generation device 108, such as a speaker or remote control, and a network interface device 110.

In a particular embodiment, as depicted in FIG. 3, the disk drive unit 106 may include a computer-readable medium 112 in which one or more sets of instructions 114, e.g. software, can be embedded. Further, the instructions 114 may embody one or more of the methods or logic as described herein. In a particular embodiment, the instructions 114 may reside completely, or at least partially, within the main memory 94, the static memory 96, and/or within the processor 92 during execution by the computer system 90. The main memory 94 and the processor 92 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 114 or receives and executes instructions 114 responsive to a propagated signal, so that a device in communication with a network 116 can communicate voice, video or data over the network 116. Further, the instructions 114 may be transmitted or received over the network 116 via the network interface device 110.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, SIP, H.323, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A telephonic switching system for a customer premises comprising:

a network interface device comprising a splitter and a switch, the switch having an output connected to a home wiring network, the switch to selectively provide one of a first analog voice signal or a second analog voice signal to the home wiring network via the output, the splitter to split a combined voice and digital signal into the first analog voice signal and digital signal, the splitter to provide the first analog voice signal to the switch separately from the digital signal; and a first digital logic device separate from the network interface device, the first digital logic device to receive the digital signal from the splitter, convert the digital signal to the second analog voice signal based on a first protocol type, and provide the second analog voice signal to the switch, the first digital logic device to generate a control signal to change the position of the switch from communicatively coupling the second analog voice signal to the home wiring network to communicatively coupling the first analog voice signal to the home wiring network based on a voice over Internet protocol switch configuration signal in the digital signal, and when the digital signal is based on a second protocol type, converting the digital signal to the second analog voice signal with a second digital logic device different from the first digital logic device.

2. The system according to claim 1, wherein the digital signal is a digital subscriber line signal.

3. The system according to claim 1, wherein the first and second analog voice signals are time division multiplexing signals.

4. The system according to claim 1, wherein the digital logic device includes a digital subscriber line modem to receive the digital signal from the splitter.

5. The system according to claim 4, wherein the digital logic device includes a logic unit in communication with the digital subscriber line modem the logic unit to generate the control signal to selectively provide the first and second analog voice signals to the voice output.

6. The system according to claim 5, wherein the digital logic device comprises a voice over Internet protocol adapter in communication with the digital subscriber line modem, the voice over Internet protocol adapter to generate the second analog voice signal from the digital signal.

7. A method of switching between voice signals, the method comprising:
  separating a combined voice and digital signal into a first analog voice signal and a digital signal;
  communicating the first analog voice signal to a switch, the switch having an output connected to a home wiring network, the switch to selectively provide one of the first analog signal or a second analog voice signal to the home wiring network via the output;
  when the digital signal is associated with a first protocol type, converting the digital signal into the second analog voice signal with a first digital logic device separate from the switch;
  when the digital signal is associated with a second protocol type, converting the digital signal into the second analog voice signal with a second digital logic device different from the first digital logic device;
  identifying a voice over Internet protocol configuration signal in the digital signal;
  communicating the second analog voice signal to the switch; and
  switching from the first analog voice signal to the second analog voice signal based on the voice over Internet protocol configuration signal in the digital signal.

8. The method according to claim 7, wherein the digital signal is a digital subscriber line signal.

9. The method according to claim 7, wherein the first and second analog voice signal are time division multiplexing signals.

10. A customer premises network interface, comprising:
  a splitter to split a combined voice and digital signal into a first analog voice signal and a digital signal;
  a first voice over Internet protocol adapter separate from the splitter to generate a second analog voice signal when the digital signal is associated with a first protocol type;
  a second voice over Internet protocol adapter to generate the second analog voice signal when the digital signal is associated with a second protocol type;
  a switch, separate from the first and the second voice over Internet protocol adapters, to receive the first and second analog voice signals and to provide one of the first or the second analog voice signals to a home wiring network at a customer premises; and
  a logic unit at the customer premises to receive the digital signal and to identify a voice over Internet protocol configuration signal in the digital signal, and to generate a control instruction to change a state of the switch based on the voice over Internet protocol configuration signal.

11. A customer premises network interface as defined in claim 10, wherein the voice over Internet protocol configuration signal comprises a voice over Internet protocol service active signal.

12. A customer premises network interface as defined in claim 10, wherein the voice over Internet protocol configuration signal comprises a voice over Internet protocol connectivity status.

* * * * *